Figure 1:
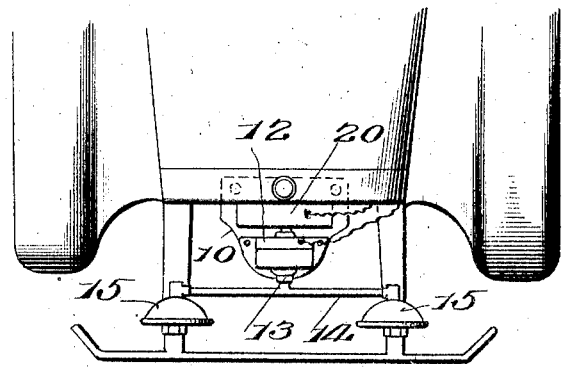

P. W. VANDERHOFF.
DIRECTION SIGNALING MECHANISM FOR MOTOR VEHICLES.
APPLICATION FILED MAY 15, 1918.

1,303,422.

Patented May 13, 1919.
2 SHEETS—SHEET 1.

Inventor
P. W. Vanderhoff
By Lacey & Lacey, Attorneys

P. W. VANDERHOFF.
DIRECTION SIGNALING MECHANISM FOR MOTOR VEHICLES.
APPLICATION FILED MAY 15, 1918.
1,303,422.
Patented May 13, 1919.
2 SHEETS—SHEET 2.
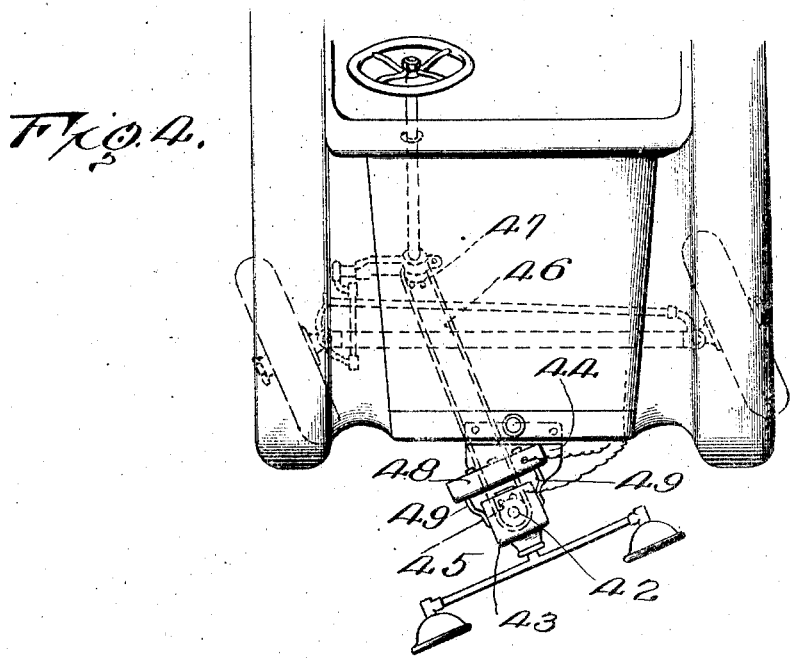
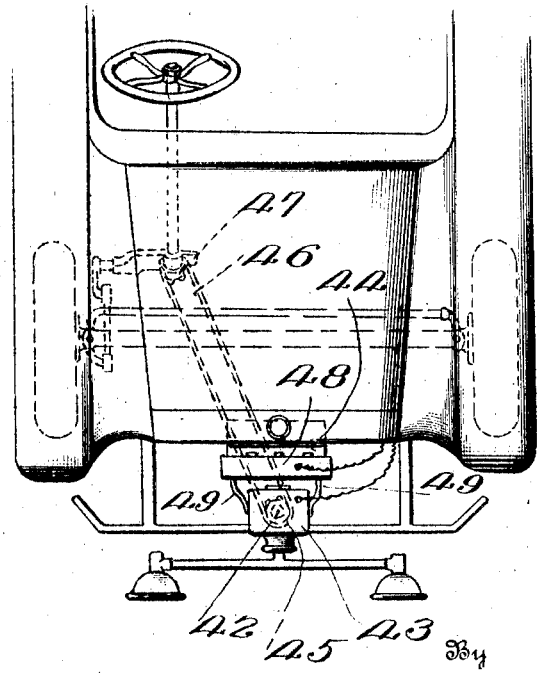
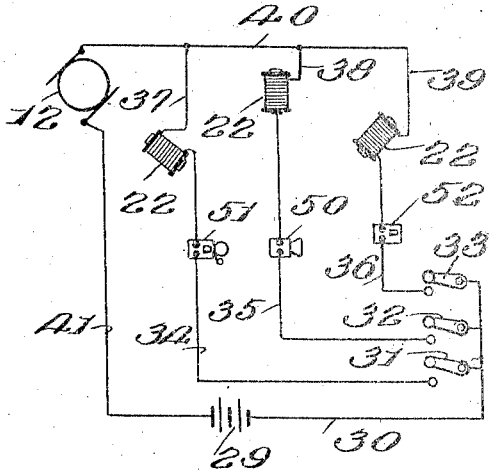
Inventor
P. W. Vanderhoff
By Lacey & Lacey, Attorneys

UNITED STATES PATENT OFFICE.

PAUL W. VANDERHOFF, OF TOPEKA, KANSAS.

DIRECTION-SIGNALING MECHANISM FOR MOTOR-VEHICLES.

1,303,422.   Specification of Letters Patent.   Patented May 13, 1919.

Original application filed May 1, 1917, Serial No. 165,702. Divided and this application filed May 15, 1918. Serial No. 234,728.

*To all whom it may concern:*

Be it known that I, PAUL W. VANDERHOFF, a citizen of the United States, residing at Topeka, in the county of Shawnee and State of Kansas, have invented certain new and useful Improvements in Direction-Signaling Mechanisms for Motor-Vehicles, of which the following is a specification.

This invention relates to an improved direction signaling mechanism for motor vehicles, being a division of my pending application for motor operated direction indicator for vehicles, filed May 1, 1917, Serial Number 165,702.

The invention has as its primary object to provide rotatable signaling devices adapted to be mounted at the front and rear of a vehicle to be turned to certain positions selectively so as to indicate an intention of the driver to proceed straight ahead, to stop, to turn to the right, or to turn to the left.

And the invention has as a further object to provide an effective electrically actuated controlling mechanism for rotating the signals and stopping the said signals at a desired position.

Figure 2:
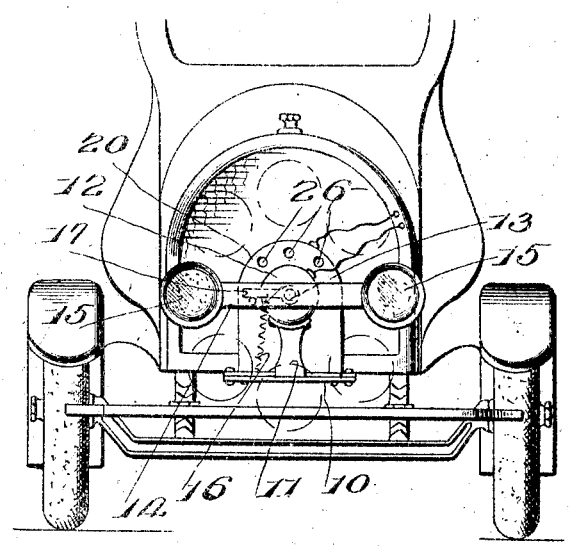
Figure 3:
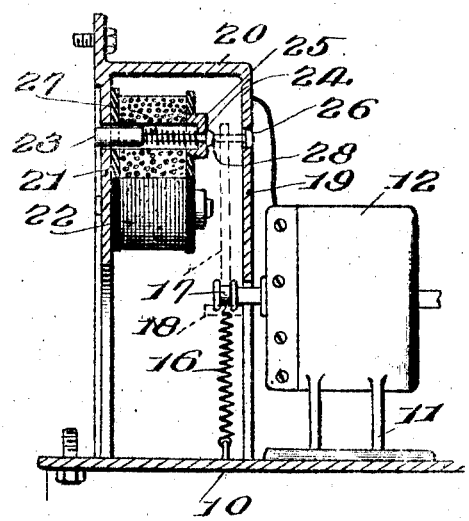

Other and incidental objects will appear as the description proceeds. In the drawings wherein I have illustrated the preferred embodiment of the invention, and wherein similar reference characters designate corresponding parts throughout the several views:

Figure 1 is a fragmentary plan view showing one of my improved signaling devices arranged in front of a conventional type of motor vehicle, Fig. 2 is a fragmentary front elevation more particularly illustrating the mounting of the signaling device, Fig. 3 is a fragmentary sectional view showing the motor controlling mechanism of the device, Fig. 4 is a fragmentary plan view showing a slightly modified form of the invention, Fig. 5 is a view similar to Fig. 4 but showing a different position of the parts, and Fig. 6 is a diagrammatic view of the wiring system employed for actuating and controlling the signals.

In carrying out the invention one of the improved signaling devices is preferably employed at the front and rear of the vehicle. However, as said devices are identical, I have illustrated only that one arranged at the front of the vehicle, which is conventionally shown, and shall describe only this signaling device in detail. As shown in this figure, a bracket 10 is connected to the front of the vehicle to project forwardly therefrom and secured to this bracket is the body or standard 11 of a motor 12. A hub 13 is fixed directly to the forward end of the motor shaft and carries arms 14 upon the outer ends of which are mounted suitable signal lights as conventionally shown at 15. These lights will, therefore, be turned as the motor shaft is turned. A helical spring 16 is connected at one end to the bracket 10 and at its opposite end to an arm 17 extending from the rear end of the motor shaft and normally holds this arm in engagement with a stop 18 extending inwardly from the front wall 19 of a housing 20. This housing is substantially arcuate in front elevation and U-shaped in cross section. With the arm 17 in engagement with the stop 18, the signal light carrying arms 14 are in horizontal position. The rear wall 21 of the housing carries a plurality of spaced solenoids 22. The plungers 23 of these solenoids are provided at their forward ends with stop rods 24 which extend through bearing plates 25 secured against the forward ends of the solenoid coils and are projectible through openings 26 formed in the front wall 19 of the housing. Helical springs 27 engaging between the plungers and plates 25, serve to normally hold the plungers and stop rods in retracted position, the plungers being held against displacement by heads 28 formed upon the outer ends of the stop rods and engaging with the plates 25. When any solenoid is energized its stop rod will be extended forwardly into the path of the arm 17 so as to limit the turning of the motor shaft and consequently, of the signals.

The solenoids are so disposed that upon the energization of the first of the said solenoids and the motor, the motor shaft will be turned until the arm 17 engages the stop rod of the said solenoid, which rod will have been, of course, projected coincident with the energization of the solenoid, for limiting further turning of the motor shaft. Under these conditions, the motor shaft will be held in such position as long as the motor and solenoid remain energized. As soon as the circuits to the motor and solenoid are broken, the spring 16 will turn the motor shaft in a reverse direction until the arm 17 engages the stop 18. A similar operation will take place when the second solenoid and the motor are energized, the spring 16 being adapted to return the motor shaft to normal position upon the deënergization of the said solenoid and motor. In like manner, a similar operation will follow when the third solenoid and the motor are energized. In this latter instance, the spring 16 will, of course, return the motor shaft to normal position upon the deënergization of the said solenoid and the motor. When turning of the motor shaft is checked by the first solenoid, the signal arms 14 will have traveled through an angle of substantially forty-five degrees from normal position and will be disposed to indicate an intention to turn the vehicle to the left. When the turning of the motor shaft is checked by the second solenoid, the signal arms will have traveled through an angle of substantially ninety degrees and will be disposed vertically to indicate an intention to stop the vehicle. When the turning of the motor shaft is checked by the last of the solenoids the signal arms will have traveled through an angle of substantially one hundred and thirty-five degrees and will be disposed to indicate an intention to turn to the right. When in normal position the signal arms will be disposed to indicate an intention to proceed straight ahead.

Any desired wiring system may be employed for controlling the action of the motor and solenoids, a simple form being that shown in Fig. 6, in which one pole of a battery 29 or other suitable source of electrical energy is connected by a wire 30 with the switch blades of a plurality of switches 31, 32 and 33 respectively, wires 34, 35 and 36 connecting the contacts of these switches with the respective solenoids 22. Wires 37, 38 and 39 lead from the solenoids respectively to a wire 40, which leads to one binding post of the motor 12, and a wire 41 leads from the other binding post of this motor to the free pole of the battery 29. Normally all of the switches are open and it will be evident that the closing of any one of the switches will close a circuit from the battery through said switch, through the corresponding solenoid to the motor, and through the motor back to the battery, one switch controlling the setting of the signal to indicate an intention to turn to the left, another controlling the setting of the signal to indicate an intention to stop, and the last controlling the setting of the signal to indicate an intention to turn to the right. All of these switches may be mounted in a single switch box which may be of any approved character and accordingly has not been shown. However, the switch box is preferably of such nature that it may be mounted upon the steering wheel of the vehicle so that in order to give any desired signal, the driver of the vehicle need only close the proper switch when the signal will be immediately turned to the selected position and held in such position until the switch is opened. Obviously, a set of circuits identical with that shown in Fig. 6 may be employed for the motor at the rear of the vehicle as well as for the motor at the front of the vehicle and their controlling solenoids, and each of the switches connected to control corresponding circuits to the front and rear.

In Figs. 4 and 5 of the drawings, I have illustrated a modification of the invention in which the standard 42 of the motor 43 has pivotal connection with the bracket 44 so that the motor may swing from right to left and in which such standard carries a sprocket gear 45 about which is trained a sprocket chain 46 which is also trained about a sprocket wheel 47 upon the steering column of the vehicle or equivalent mechanism thereof. A housing 48 corresponding to the housing 20 and inclosing the same controlling mechanism is, in this instance, secured to the body of the motor by brackets 49 so that the said housing will always occupy the same relative position with respect to the motor shaft. Obviously, this signaling device will operate in the same manner as the signaling device shown in Figs. 1, 2 and 3, but the motor and signaling device will be turned in such manner that the lights carried by the signal arms will always be directed in the direction in which the front wheels of the vehicle are traveling. The signal lights will, therefore, serve to light up the road for the driver of the vehicle when rounding curves.

In connection with my improved electrically operated signaling mechanism, I may employ a set of audible signals such as shown diagrammatically in Fig. 6, in which an electric horn is connected in the wire 35, an electric bell in the wire 34, and an electric buzzer in the wire 36, these signaling devices being indicated diagrammatically at 50, 51 and 52 respectively. Under these circumstances, a distinctive audible signal will be given, corresponding to the visual signal given by turning of the lights.

Having thus described the invention, what is claimed as new is:

1. In signals for vehicles, an electric motor adapted to be supported at the front or rear of a vehicle, a signal carried by the motor shaft, an arm fixed to the shaft and projecting therefrom to be swung by the shaft, yieldable means connected to the arm for normally holding the shaft in one position, and means mounted in concentric relation to the axis of the shaft and selectively projectible into the path of said arm for stopping the shaft in predetermined other positions.

2. In signals for vehicles, an electric motor adapted to be supported at the front or rear of a vehicle and having an armature shaft, a signal carried by said shaft, a housing disposed at the rear of the motor, an arm fixed to the shaft and projecting therefrom to be swung by the shaft within the housing, a stop projecting from the wall of the housing, a spring connected to the arm and normally holding the arm in engagement with said stop for maintaining the shaft in one position, and means arranged in concentric relation to the axes of the shaft and selectively projectible into the path of said arm for stopping the shaft in predetermined other positions.

3. In signals for vehicles, an electric motor adapted to be supported at the front or rear of a vehicle and having an armature shaft, a casing mounted adjacent the motor and having a wall thereof provided with openings, an arm carried by the shaft to be swung thereby, yieldable means connected to said arm for normally holding the shaft in one position, and means selectively projectible across the path of said arm into a corresponding one of said openings in the casing for stopping the shaft in predetermined other positions.

4. In signals for vehicles, an electric motor adapted to be supported at the front or rear of a vehicle and having an armature shaft, an arm carried by the shaft to be swung thereby, yieldable means connected to the arm and normally holding the shaft in one position, a plurality of solenoids concentrically disposed with respect to the armature shaft, bearing plates secured against the forward ends of the solenoids, plungers for the solenoids, stop rods carried by the plungers and slidable through said plates, and springs surrounding the rods and bearing between the plungers and the plates for holding the rods retracted, the rods being selectively projectible by the solenoids into the path of said arm for stopping the motor shaft in predetermined other positions.

In testimony whereof I affix my signature.

PAUL W. VANDERHOFF. [L. S.]